Patented Aug. 31, 1954

2,688,015

UNITED STATES PATENT OFFICE 2,688,015

MANUFACTURE OF SULFAMERAZINE

Harold R. Chipman, Elmira, Ontario, and Taylor H. Evans, Guelph, Ontario, Canada, assignors to United States Rubber Company, New York, N. Y., a corporation of New Jersey No Drawing. Application July 16, 1952, Serial No. 299,218

1 Claim. (Cl. 260—239.75)

This invention relates to the manufacture of the therapeutic agent sulfamerazine, and more particularly it relates to the manufacture of sulfamerazine with the aid of sodium methylate.

It has previously been proposed to manufacture sulfamerazine (i. e., 2-sulfanilamido-4-methylpyrimidine), from sulfaguanidine (i. e., sulfanilylguanidine) and chlorovinylmethyl ketone (i. e., 1-chloro-1-butene-3-one). The chlorovinylmethyl ketone reacted with the sulfaguanidine with the elimination of water and hydrogen chloride, thereby forming a pyrimidine ring. The condensation was effected through the agency of sodium ethylate in an alcoholic medium, and the sulfamerazine was eventually isolated with the aid of acetic acid, according to the following equation:

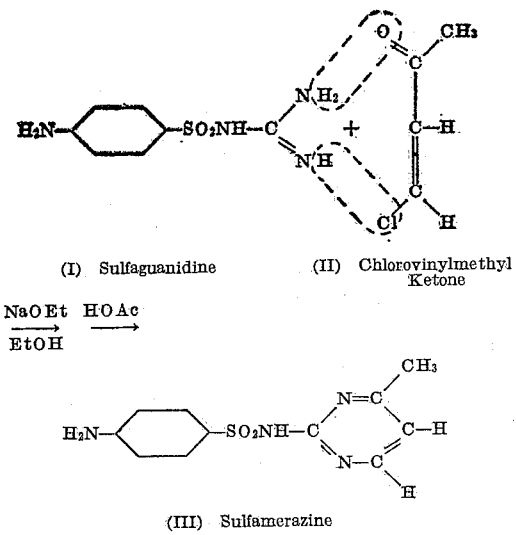

The foregoing process has a number of disadvantages in practice. For one thing, the yield of sulfamerazine is not as high as would be desirable, particularly in view of the fact that sulfamerazine is a relatively expensive chemical. In addition, there is a tendency to formation of decomposition products or by-products during the reaction which are highly-colored, and which have essentially the same solubility characteristics as the sulfamerazine, so that it is very difficult to separate the colored materials from the sulfamerazine. This is a particular disadvantage in connection with the manufacture of pharmaceutical sulfamerazine, which must be essentially white. Another disadvantage of the conventional process is that the reaction mixture tends to take the form of a rather thick slurry, which is difficult to stir, and difficult to heat and cool rapidly, unless excessive quantities of alcohol are present, with consequent dilution and tendency to further loss in yield.

It has now been found, unexpectedly, that if the reaction between sulfaguanidine and chlorovinylmethyl ketone is carried out with sodium methylate in a medium comprised of methanol, the foregoing disadvantages can be mitigated to a large extent, and other surprising advantages are achieved.

In carrying out the invention, the sulfaguanidine, previously dried to a constant weight to remove the one mole of water of crystallization that it normally contains, is suspended in a methanol solution of the sodium methylate. The chlorovinylmethyl ketone is then added gradually to this suspension, while agitating the mixture vigorously. An exothermic reaction takes place, and the rate of addition is controlled so as to prevent an excessive rise in temperature. It is preferred to employ in the reaction mixture slightly more than one mole of chlorovinylmethyl ketone for each mole of sulfaguanidine. A 10% or 15% molar excess of chlorovinylmethyl ketone produces a proportionate increase in the yield of sulfamerazine, based on the sulfaguanidine. A larger excess of the ketone may be used if desired, say a 25% excess, but, for reasons of economy it is usually not preferred to do so, since there is no proportionate added advantage in yield. The amount of sodium in the reaction mixture is preferably about two or three moles, per mole of sulfaguanidine. The sodium is generally added as such initially to the alcoholic medium to form the desired sodium methylate in situ, before adding the sulfaguanidine. The amount of methanol employed is generally within the range of from 20 to 70 moles, preferably 35–50 moles, per mole of sulfaguanidine.

After the addition of the chlorovinylmethyl ketone to the reaction mixture has been completed, stirring and heating of the mixture are preferably continued at a temperature of about 50° C., or at reflux temperature (about 65° C.), for a period of several hours, to bring the reaction substantially to completion. The reaction mixture is generally not markedly colored, but may have a slight cream color. This is in contrast with the results obtained when employing sodium ethylate in a medium of ethanol, in accordance with the prior art practice, wherein it is observed that the reaction mixture becomes yellow as soon as the addition of chlorovinylmethyl ketone is begun, and by the time the reaction is completed, the reaction mixture has become dark yellow or brown due to the presence of colored by-products. These colored materials tend to remain, to a greater or lesser extent, with the final product, making it quite difficult to produce truly white sulfamerazine.

It is also surprisingly observed that the consistency of the reaction mixture is much thinner when employing methanol, compared with the conventional reaction mixture containing ethanol. The improved methanol reaction mixture is relatively light and easy to stir, whereas the ethanol mixture tends to take the form of a rather thick and heavy slurry which can be stirred only with difficulty, and which impedes the transfer of heat into or out of the reaction mixture. The consistency of the reaction mixture is apparently in large part a consequence of the solubility of the sulfaguanidine in the alcoholic medium. In an ethanol solution of sodium ethylate, sulfaguanidine is incompletely soluble even at temperatures as high as 80° C., whereas at 10° C. it is only about 5% soluble. In contrast to this, it is found that sulfaguanidine dissolves completely in methanol at 50° C., and about 40% remains in solution at 10° C.

Upon completion of the reaction, the mixture is cooled to room temperature to precipitate completely the material which is insoluble in the alcoholic medium. The methanol-insoluble material is comprised of the sodium salt of sulfamerazine along with sodium chloride as a by-product. The insoluble material obtained in this way is surprisingly different from the material that would be obtained from an ethanol medium. The precipitated material obtained according to the present procedure is relatively free from unreacted sulfaguanidine and by-products, and contains virtually all of the sulfamerazine produced, in the form of the sodium salt. When ethanol is used in place of methanol, this insoluble portion tends to contain significantly larger proportions of by-products and unreacted sulfaguanidine. The present precipitate is crystalline, and is easily filtered off to form a firm and compact filter cake having only a very slight yellow color. The alcoholic filtrate contains almost all of the colored material. The filter cake may be washed with a small amount of methanol to remove the bulk of the color from the cake. It is found that the filter cake resulting from the methanol reaction medium is unusually compact, compared with the filter cake resulting from the corresponding process using ethanol, which gives a very bulky precipitate that is difficult to wash on the filter because of the relatively great amount of hold-up of the colored alcoholic solution in the large volume of the cake.

The filter cake may then be dissolved in water, and further decolorized, for example, by heating in the presence of a small amount of decolorizing charcoal and sodium hydrosulfite. The solution may then be filtered and cooled to room temperature, after which it may be acidified to precipitate the sulfamerazine. The sulfamerazine obtained in this way is only very slightly off-white, and can be purified easily to yield a pharmaceutical grade.

The following example will illustrate the invention in more detail.

*Example*

| | Parts by weight |
|---|---|
| Sodium | 21.0 |
| Absolute methanol | 474 |
| Sulfaguanidine | 64.2 |
| Chlorovinylmethyl ketone | 35.6 |

The methanol was placed in a reaction vessel equipped with a suitable stirrer, a heating and cooling jacket, and a reflux condenser, and the sodium was added gradually over a period of 40 minutes. The temperature of the methanol rose to the boiling point, and the mixture was subsequently cooled to 15° C. The sulfaguanidine was suspended in this mixture, and thereafter the chlorovinylmethyl ketone was added gradually over a period of 15 minutes, during which time the temperature rose to about 40° C. (It is interesting to note that if ethanol had been used as the reaction medium, the temperature would have risen considerably higher, and also the reaction mixtures would have become yellow in color due to the presence of decomposition products.) The reaction mixture was then heated to 50° C. for a period of two hours, and thereafter it was refluxed at a temperature of about 65° C. for a period of three hours. The mixture was then cooled to 20° C., and filtered to remove the alcohol-insoluble portion. The filtrate was distilled under a reduced pressure of 160 mm. at a bath temperature of 40° C. to remove the methanol. The alcohol-insoluble material was added to the residue in the still pot. The resulting mixture was dissolved in 600 parts of water at a temperature of 80°–90° C., and was treated at this temperature with a small amount of decolorizing charcoal and sodium hydrosulfite, and filtered. The solution was cooled to 15° C., and filtered, yielding 7 g. sulfaguanidine. The addition of 30 parts of acetic acid to the filtrate precipitated 68 parts of crude sulfamerazine, M. P. 232–34° C. (corrected). This represented a yield of 96.4% based on the weight of sulfaguanidine consumed, and a yield of 76.8% based on the chlorovinylmethyl ketone.

From the foregoing it is evident that the use of sodium methylate in a reaction medium comprised of methanol in accordance with the invention provides a remarkably improved process. Whereas the process using sodium ethylate and ethanol generally resulted in yields of about 90%, based on the sulfaguanidine consumed, the present process using methanol attained yields in excess of 95%. Similarly, the use of ethanol produced a yield of only about 64% based on the chlorovinylmethyl ketone, whereas the present process produced a yield of about 77% on this same basis.

Because the reaction mixture based on methanol is relatively light and easy to stir, it is perfectly feasible to reduce the volume of alcohol employed by about one-third, with a consequent proportionate increase in the productivity of the reaction equipment.

Moreover, the product obtained by the present process has a superior color and a significantly higher degree of purity.

The foregoing advantages are a direct consequence of the employment of methanol as a medium for the reaction. The methanol has a favorable effect on the crystal size of the sodium sulfamerazine as well as a suppressing effect on the extent of side reactions, with consequent reduction in color. As a result of the more favorable crystal size, the reaction slurry is thinner and can be pumped and filtered more easily.

Having thus described our invention, what we claim and desire to protect by Letters Patent is:

A method comprising in combination the steps of gradually adding a 10% to 15% molar excess of chlorovinylmethyl ketone to a suspension of one mole of sulfaguanidine in a preformed solution of from 2 to 3 moles of sodium methylate in from 35 to 50 moles of methanol, heating the resulting mixture at a temperature of from 50° to 65° C., the said sulfaguanidine dissolving completely in the methanol at such temperatures to provide an essentially fluid and homogeneous reaction mix, continuing the said heating for several hours to substantially complete the reaction, thereafter cooling the resulting mixtures to room temperature to precipitate completely a methanol-insoluble material comprised of the sodium salt of sulfamerazine in crystalline, easily-filtered form, and relatively free from unreacted sulfaguanidine and by-products, the bulk of colored material in the said reaction mix remaining in the methanolic mother liquor, and thereafter filtering off the sodium sulfamerazine in a form relatively free of impurities and colored materials.

References Cited in the file of this patent

FOREIGN PATENTS

| Number | Country | Date |
| --- | --- | --- |
| 594,331 | Great Britain | Nov. 7, 1947 |
| 609,094 | Great Britain | Sept. 24, 1948 |
| 609,571 | Great Britain | Oct. 4, 1948 |